UNITED STATES PATENT OFFICE.

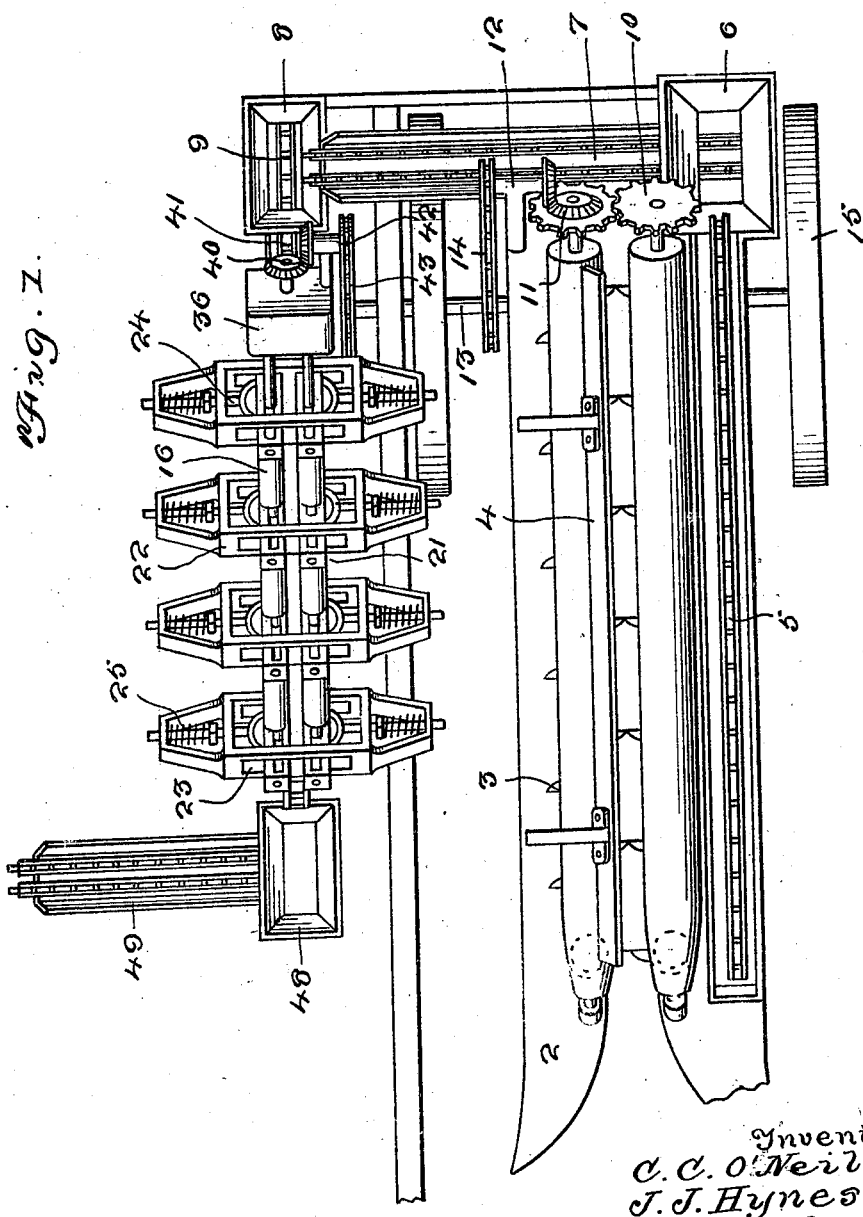

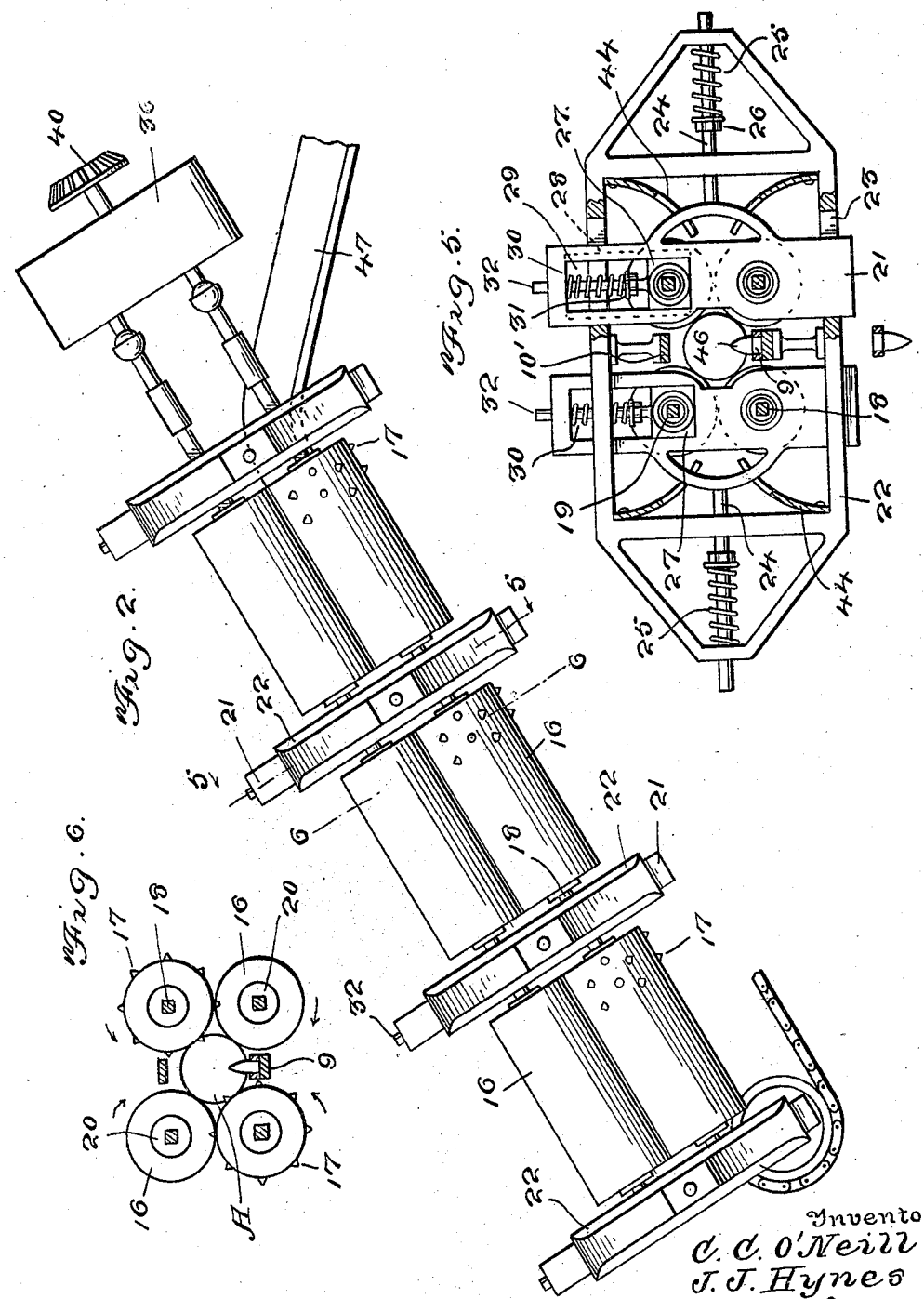

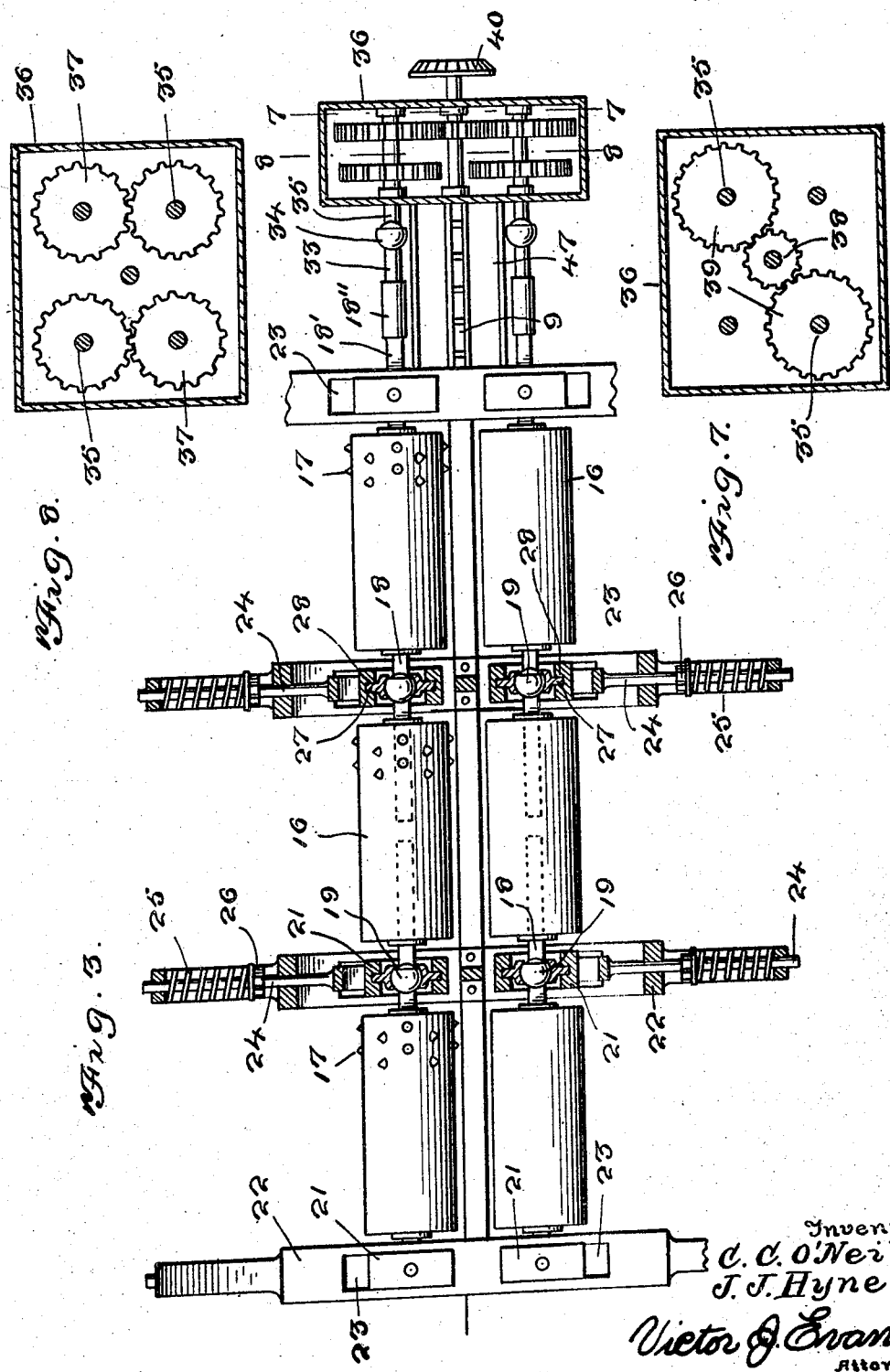

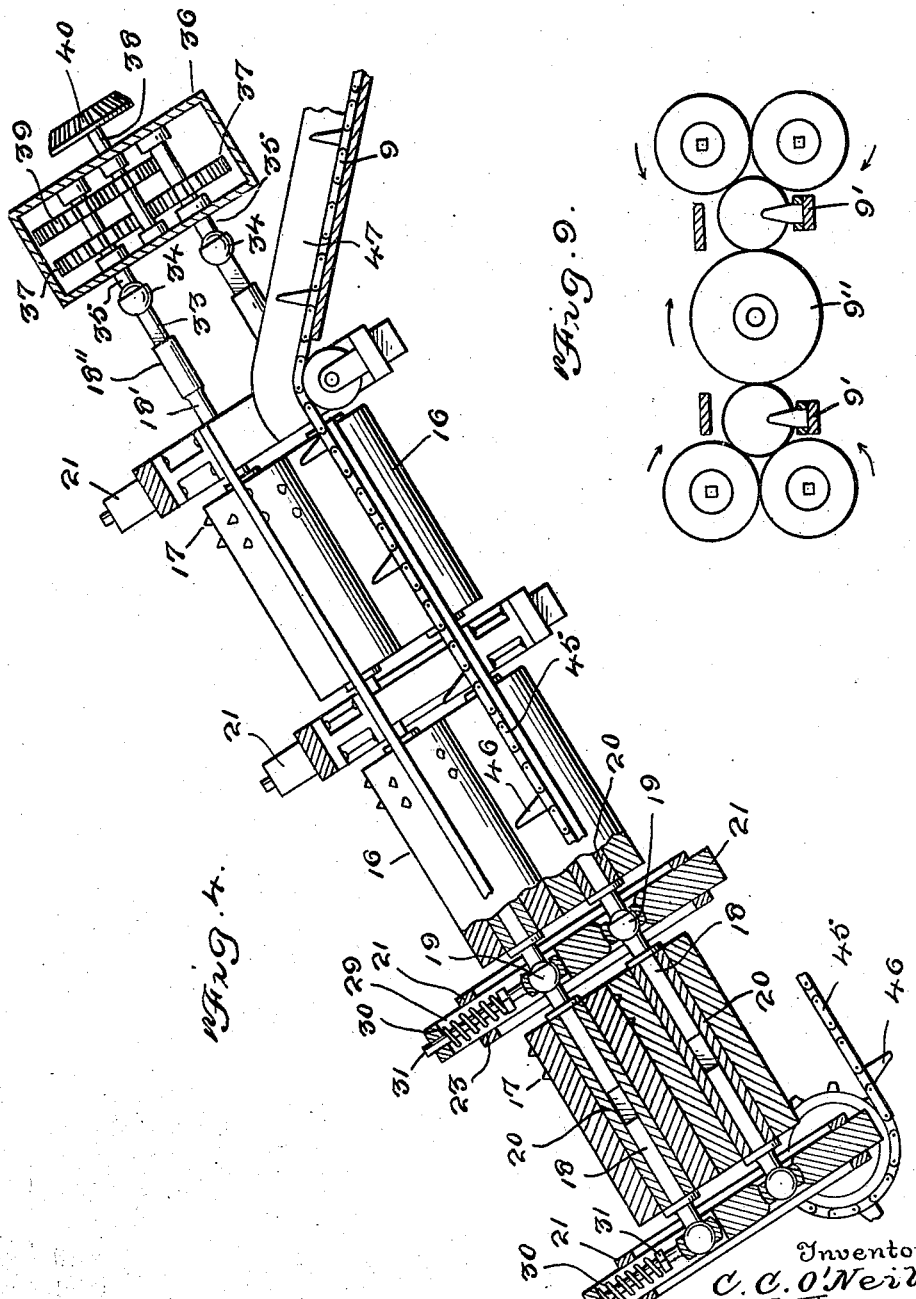

CHARLES C. O'NEILL AND JOHN J. HYNES, OF ANNCAR, NEBRASKA.

CORN-HUSKING MACHINE.

1,419,895.  Specification of Letters Patent.  Patented June 13, 1922.

Application filed October 7, 1921. Serial No. 506,151.

*To all whom it may concern:*

Be it known that we, CHARLES C. O'NEILL and JOHN J. HYNES, citizens of the United States, residing at Anncar, in the county of Holt and State of Nebraska, have invented new and useful Improvements in Corn-Husking Machines, of which the following is a specification.

This invention relates to means for husking corn, the general object of the invention being to provide means for taking the husk off the ears without damaging the grains with means for automatically causing the husking means to conform to the shape and size of the ears passing between them so that the machine will husk ears of different sizes.

Another object of the invention is to provide spring means for holding the husking means in engagement with the ears with means for adjusting the spring means to permit the device to be used with "soft" corn.

Another object of the invention is to make the apparatus applicable to an ear harvesting machine so that the ear will be husked as it comes from the picker means.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a diagrammatic plan view showing the invention applied to a harvesting machine.

Figure 2 is a side view of the husking apparatus.

Figure 3 is a plan view thereof with parts in section.

Figure 4 is a side view with parts in section.

Figure 5 is a section on line 5—5 of Figure 2.

Figure 6 is a section on line 6—6 of Figure 2.

Figure 7 is a section on line 7—7 of Figure 3.

Figure 8 is a section on line 8—8 of Figure 3.

Figure 9 is a sectional detail view showing a modification.

Figure 1 shows the invention as applied to an ear harvesting machine which snaps the ears from the stalks by means of the inclinedly arranged rollers which are rotatably supported on the inclined guiding frame 2 which directs the stalks between the rollers. These rollers will snap the ears off the stalks and are provided with the teeth 3 for this purpose. The rollers and the baffle plate 4 direct the ears on to the conveyor 5 which deposits them into the hopper 6. A conveyor 7 carries the ears from the hopper 6 to the hopper 8 and a conveyor 9 carries the ears from this hopper 8 to the husking means. The snapping rollers 1 are geared together by the gears 10 and beveled gears 11 connect one of these rollers with a stub shaft 12 which carries a sprocket and this sprocket is connected with a sprocket on the shaft 13 of the machine by the chain 14 so that power is taken from one of the ground wheels 15. The conveyors may also be driven from power taken from the ground wheels.

The husking means comprises a plurality of rollers 16 which are arranged in a number of groups, each group containing four rollers. These rollers are preferably covered with rubber and two rollers of each group are provided with small projections 17 at their front ends, the rest of the roller being smooth. This form of roll will remove the husks from the ear without shelling the corn, the teeth loosening the husks so that the rubber surface can easily remove them from the ear. The teeth being at the front end of the roll will not come in contact with the ear after the husks have been removed. The rollers bearing the teeth are diagonally arranged as shown in Figure 6. As shown in this figure the four rollers are arranged in pairs with a space between each pair through which the conveyor 9 passes so that the ears of corn, one of which is shown at A, will pass longitudinally between the rollers and will be engaged by all four of the rollers. The rollers of each pair contact with each other as shown. A strip 10 is placed above the conveyor between the upper rollers so as to prevent the ears of corn from being forced upwardly from between the rollers. The rollers of the different groups are all in alignment and the aligned rollers are connected together by the shafts 18 and the universal couplings 19. The shafts 18 have sliding engagement with the rollers by fitting in the hollow cores 20 of the rollers. These universal joints are carried by horizontally movable frames 21 which are mounted in the stationary frames 22 which are suitably supported on the machine. The frames 22 are provided with slots 23 the walls of which are engaged by the frames 21 and the frames 21 are normally held with their inner edges against the inner ends of the slots by the spring pressed forked members 24 which are slidably mounted in the frame 22 and have their forked parts connected with the frames 21. The springs for pressing these forked members inwardly are shown at 25 and bear against nuts 26 on the members 24. The joints for the upper shafts are carried by vertically movable blocks 27 which are slidable in guideways 28 formed in the side walls of the elongated openings 29 in the upper parts of the frames 21. These blocks are normally held against the bottoms of the openings by the springs 30 pressing against nuts 31 on the guiding rods 32 which are connected with the blocks and pass through holes in the top of the frames 21.

It will be seen from the above that the rollers in one group can be moved out of alignment with those of the other due to the sliding shafts, the universal joints and the movable frames 21 and the sliding blocks 27. Thus the husking rollers will adjust themselves to conform to the shape and size of the ears passing between them so that all sorts of ears will be husked. By adjusting the tension of the spring the device can be made to husk "soft" corn as the tension may be made just sufficient to strip the husks from the ear without damaging the grains.

The shafts 18' for the first group of rollers are provided with sockets 18'' for slidingly receiving the ends of shafts 33. These shafts 33 are connected by ball and socket connections 34 with shafts 35, said shafts extending into a gear casing 36 where each pair of the shafts 35 is connected together by the gears 37 and where one shaft of each pair is geared to a central shaft 38 by the gears 39. Shaft 38 passes through the casing and is provided with a beveled pinion 40 which meshes with a pinion 41 on a stub shaft 42 which is connected by sprockets and chain 43 with the axle 13 of the machine.

Stripping plates 44 are provided in the frames 22 for stripping the husks from the roller.

The conveyors may be made as shown in Figures 4, 5 and 6 where they are shown as consisting of endless chains 45 carrying lugs 46 for engaging the ears. The front part of the conveyor 9 passes through a trough 47 which supports the ears until they reach the husking rollers.

As shown in Figure 9 we may provide two conveyors 9' so that the device can husk two rows of ears, the two rows of ears being held against the two edges of husking rollers by a centrally arranged roller 9''. In this form instead of the four rollers working against the ear only two rollers engage the ear in addition to the large central roller, this large central roller acting to hold both rows of ears against the husking roller, as clearly shown in Figure 9. In other respects this form of the apparatus is similar to that above described.

From the above it will be apparent that the ears of corn snapped from the stalks by the snapping rollers will be fed to the husking means where the husk will be removed as the ears pass between the rollers. After passing between the rollers the conveyor carries the husked ears into a hopper 48 where a conveyor 49 conveys them to a wagon or the like. By the specified connections between the husking rollers they will conform themselves to the shapes and sizes of the ears passing between them so that they will husk all kinds of ears and by adjusting the spring means "soft" corn can be husked as well as hard corn. The teeth at the front of the rollers will act to loosen the husk so that the rubber covered surface of the rollers can easily remove them from the ear. As before stated, this arrangement of parts will husk the ear without shelling the grain.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. A husking apparatus comprising a plurality of husking rollers, means for conveying the ears of corn between the rollers, means for adjustably connecting the rollers together so that they can conform themselves to the shapes and sizes of the ears passing between them and means for rotating the rollers.

2. A husking apparatus comprising a plurality of husking rollers, means for conveying the ears of corn between the rollers, means for adjustably connecting the rollers together so that they can conform themselves to the shapes and sizes of the ears passing between them, means for rotating the rollers and adjustable spring means for holding the rollers against the ears.

3. A husking apparatus comprising a plurality of spaced frames, a group of rollers located between each pair of frames, the rollers of one group being in alignment with those of the other groups, means for connecting the aligned rollers of the groups together, such means comprising universal joints, slidable means for supporting the said joints, spring means for holding the sliding means in a position with the rollers in alignment, means for conveying the ears of corn between the rollers and means for adjusting the tension of the springs.

4. A husking apparatus comprising a plurality of rollers arranged in groups, the rollers of each group being in alignment with the rollers of the other groups, means for conveying the ears of corn between the rollers, shafts connecting the aligned rollers together, said shafts being slidably connected with the rollers, a universal joint connecting the shaft of each roller with the shaft of the adjacent roller, slidable frames supporting the said joints, spring controlled means for normally holding the frames in a position with the rollers in alignment, means for adjusting said springs and means for driving the rollers.

5. An apparatus for husking corn comprising a plurality of stationary frames spaced apart, a pair of frames horizontally slidable in each main frame, adjustable spring means for holding said slidable frames in their inner positions, each slidable frame having a vertically arranged opening therein, a block vertically movable in said opening, spring means for holding each block at the bottom of the opening, a group of husking rollers located between each main frame, the rollers of one group being in alignment with those of the others, shafts connecting the aligned rollers together, said shafts having slidable connection with the rollers and each shaft including a universal joint, the universal joints for the upper rollers being carried by the sliding blocks and those for the lower rollers being carried by the horizontally movable frames, means for driving the rollers and conveying means for conveying the ears of corn between the rollers.

6. In a husking apparatus, a husking roller having small projections at its front end the rest of the roller being plain.

7. In a husking machine, a husking roller having a rubber covered surface and small projections at its front end the central and rear portions being smooth.

8. In a husking machine, a plurality of husking rollers arranged in groups, means for yieldingly supporting the rollers, means for flexibly connecting the rollers together so that they can conform themselves to the shape and size of the ears passing between them and means for conveying the ears of corn between the rollers.

9. In a husking machine, a plurality of groups of rollers, means for flexibly connecting the rollers of one group with those of the other groups, means for yieldingly holding the rollers in alignment, means for conveying the ears of corn between the rollers and stripper means for stripping the husks from the rollers.

10. In a husking machine, a plurality of groups of rollers, the rollers of one group being in alignment with those of the other, means for connecting the aligning rollers together, means for yieldingly holding the rollers in alignment, a conveyor for conveying the ears between the rollers and a strip for preventing the ears of corn being pushed from between the upper rollers.

In testimony whereof we affix our signatures.

CHARLES C. O'NEILL.
JOHN J. HYNES.